(12) United States Patent
Lin et al.

(10) Patent No.: US 9,971,132 B2
(45) Date of Patent: May 15, 2018

(54) ZOOM LENS

(71) Applicant: Young Optics Inc., Hsinchu Science Park (TW)

(72) Inventors: Ying-Hsiu Lin, Hsinchu Science Park (TW); Kuo-Chuan Wang, Hsinchu Science Park (TW)

(73) Assignee: YOUNG OPTICS INC., Hsinchu Science Park (TW)

( * ) Notice: Subject to any disclaimer, the term of this patent is extended or adjusted under 35 U.S.C. 154(b) by 0 days. days.

(21) Appl. No.: 15/137,985

(22) Filed: Apr. 25, 2016

(65) Prior Publication Data

US 2017/0307862 A1    Oct. 26, 2017

(51) Int. Cl.
| | |
|---|---|
| *G02B 15/177* | (2006.01) |
| *G02B 15/16* | (2006.01) |
| *G02B 13/00* | (2006.01) |
| *G02B 13/04* | (2006.01) |
| *G02B 27/00* | (2006.01) |

(52) U.S. Cl.
CPC ......... *G02B 15/177* (2013.01); *G02B 13/009* (2013.01); *G02B 13/0045* (2013.01); *G02B 13/04* (2013.01); *G02B 15/161* (2013.01); *G02B 27/0025* (2013.01)

(58) Field of Classification Search
CPC ...... G02B 13/009; G02B 15/02; G02B 15/08; G02B 15/15; G02B 15/161; G02B 15/177
USPC .................................................. 359/686–692
See application file for complete search history.

(56) References Cited

U.S. PATENT DOCUMENTS

| | | | |
|---|---|---|---|
| 4,579,428 A | 4/1986 | Fujioka | |
| 4,682,860 A | 7/1987 | Tanaka et al. | |
| 4,726,665 A | 2/1988 | Itoh | |
| 4,838,669 A | 6/1989 | Ogata et al. | |
| 4,998,808 A | 3/1991 | Shibayama | |
| 6,498,687 B1 | 12/2002 | Sekita et al. | |
| 7,116,490 B1 | 10/2006 | Chuang | |
| 8,830,599 B2 | 9/2014 | Kubota et al. | |
| 9,091,843 B1 | 7/2015 | Hudyma et al. | |
| 9,134,516 B2 * | 9/2015 | Kimura ................ G02B 15/177 |
| 9,207,430 B2 | 12/2015 | Ohashi et al. | |
| 2009/0091845 A1* | 4/2009 | Katakura ............ G02B 15/177 |
| | | | 359/691 |
| 2010/0188553 A1* | 7/2010 | Mihara ................ G02B 15/177 |
| | | | 348/340 |
| 2012/0120501 A1* | 5/2012 | Katayose ............ G02B 15/177 |
| | | | 359/686 |
| 2015/0244942 A1 | 8/2015 | Shabtay et al. | |

FOREIGN PATENT DOCUMENTS

| | | |
|---|---|---|
| CN | 100410717 C | 8/2008 |
| CN | 105242385 A | 1/2016 |

* cited by examiner

*Primary Examiner* — Darryl J Collins
(74) *Attorney, Agent, or Firm* — Muncy, Geissler, Olds & Lowe, P.C.

(57) ABSTRACT

A zoom lens includes, in order from a magnified side to a minified side, a first lens group, an aperture stop, and a second lens group. The second lens group has at least one aspheric surface. The zoom lens satisfies the conditions: $0.1 < Ic/TTLw < 0.15$ and $TTLw/EFLw \leq 10$, where Ic denotes a radius of an image circle, TTLw denotes a total track length of the zoom lens in the wide configuration, and EFLw denotes an effective focal length of the zoom lens in the wide configuration.

19 Claims, 17 Drawing Sheets

ZOOM LENS

BACKGROUND OF THE INVENTION a. Field of the Invention

The invention relates generally to an optical lens, and more particularly to a zoom lens.

b. Description of the Related Art

With the advances in optical-electronic technologies, image-sensing devices (such as a projector, a digital video camera and a digital camera) have been widely used in daily life and various industries. In an image-sensing device, an optical lens plays an important role in determining image qualities. Therefore, there is a growing need for fabricating a compact and high-performance zoom lens used in image-sensing devices. It is also desirable to provide a zoom lens that is favorable for correcting aberrations and may achieve wide viewing angle, high resolution and 24-hours confocal image-capturing quality.

BRIEF SUMMARY OF THE INVENTION

According to one aspect of the present disclosure, a zoom lens includes, in order from a magnified side to a minified side, a first lens group, an aperture stop, and a second lens group. The second lens group has at least one aspheric surface. The zoom lens satisfies the conditions: $0.1 < Ic/TTLw < 0.15$ and $TTLw/EFLw \leq 10$, where Ic denotes a radius of an image circle, TTLw denotes a total track length of the zoom lens in the wide configuration, and EFLw denotes an effective focal length of the zoom lens in the wide configuration.

According to the above embodiment, the zoom lens may have at least one cemented lens to balance chromatic aberration, and may have at least one aspheric lens to reduce aberration and the total track length. Further, the zoom lens may have a reduced number of lenses and wide viewing angles. Besides, when the zoom lens is used for imaging under visible light and infrared light, chromatic aberrations may be corrected to result in small focus shift to achieve good 24-hours confocal imaging quality. Accordingly, the zoom lens is featured with good correction ability, reduced size, and improved image quality.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
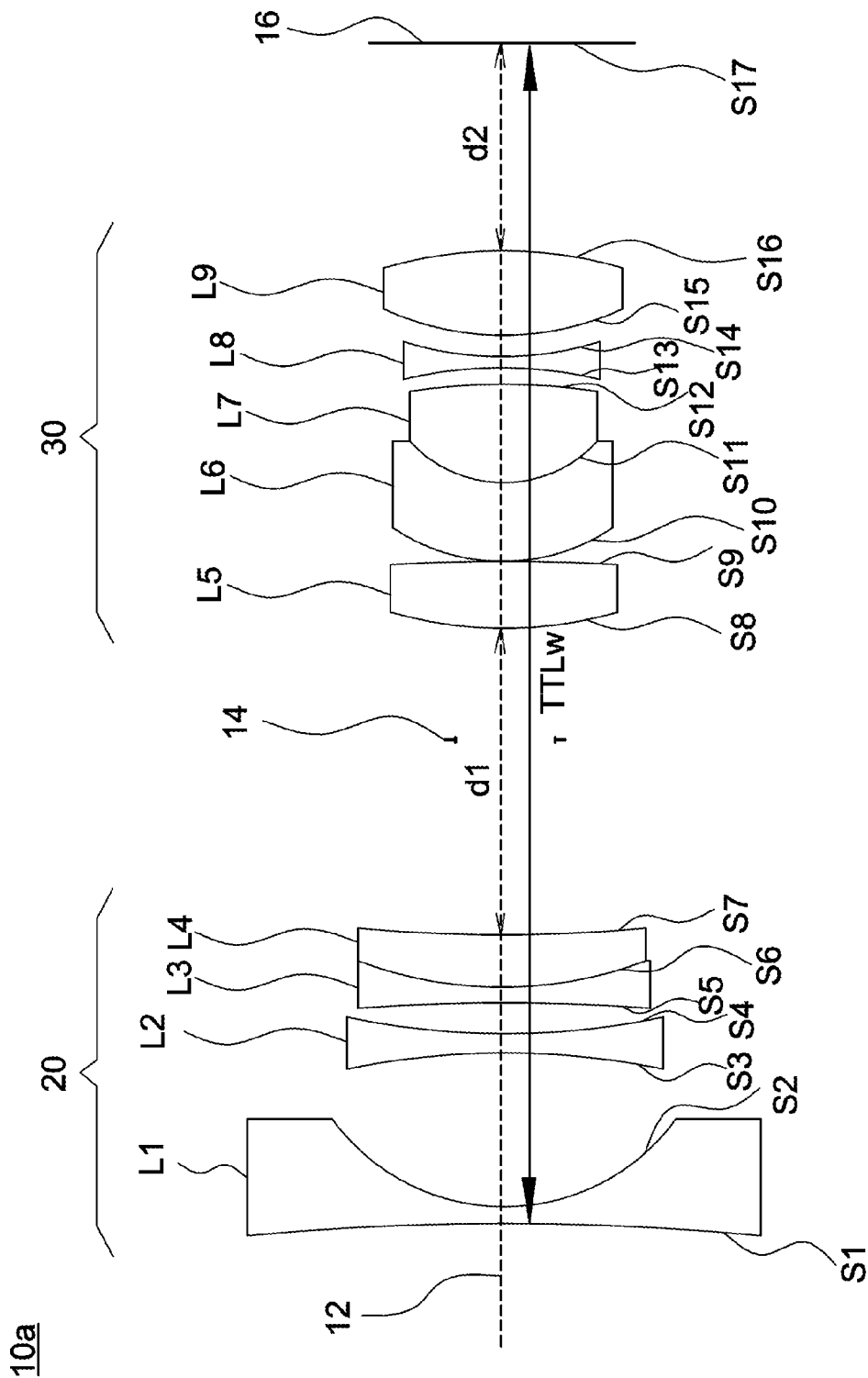
FIG. 1A and FIG. 1B are schematic diagrams respectively illustrating a zoom lens in the wide configuration and in the tele configuration according to an embodiment of the invention.

A zoom lens according to an embodiment of the invention may include a first lens group of negative refractive power and a second lens group of positive refractive power. The zoom lens according to one embodiment may satisfy the following condition:

$0.1 < Ic/TTLw < 0.15$, where Ic denotes a radius of an image circle, and TTLw denotes a total track length of the zoom lens in the wide configuration. The total track length TTL is defined as a distance along an optical axis between a magnified-side surface of a first lens and an image sensor plane. For example, as shown in FIG. 1A, the total track length TTLw equals a distance between an image sensor 16 and a magnified-side surface S1 of a first lens L1 of a zoom lens 10a in the wide configuration. In case Ic/TTLw<0.1, it may indicate that the total track length is too large to miniaturize the entire lens assembly. In an alternate embodiment, the zoom lens may satisfy the condition: 0.1<Ic/TTLw<0.12. In one embodiment, the zoom lens may satisfy the condition:

TTLw/EFLw≤10, where TTLw denotes a total track length of the zoom lens in the wide configuration, and EFLw denotes an effective focal length of the zoom lens in the wide configuration. In case the condition of TTLw/EFLw≤10 is satisfied, the total track length of the zoom can be effectively controlled to be favorable for a compact lens design. Further, in one embodiment, the total track length TTL of the zoom lens may be smaller than 33.2 mm.

In one embodiment, a zoom ratio of the zoom lens is in the range of 2-3; that is, the zoom lens may satisfy the condition:

2≤EFLt/EFLw≤3, where EFLt denotes an effective focal length of the zoom lens in the tele configuration, and EFLw denotes an effective focal length of the zoom lens in the wide configuration. In an alternate embodiment, the zoom lens may satisfy the condition 1.7≤EFLt/EFLw≤3.

In one embodiment, an F number of the zoom lens is in the range of 1.8 (wide configuration) to 2.48 (tele configuration). Further, a focus shift in an image plane for infrared (IR) of the zoom lens may be smaller than 0.02 mm.

According to the above embodiments, the zoom lens is featured with good correction ability, reduced size, and improved image quality.

Figure 1B:
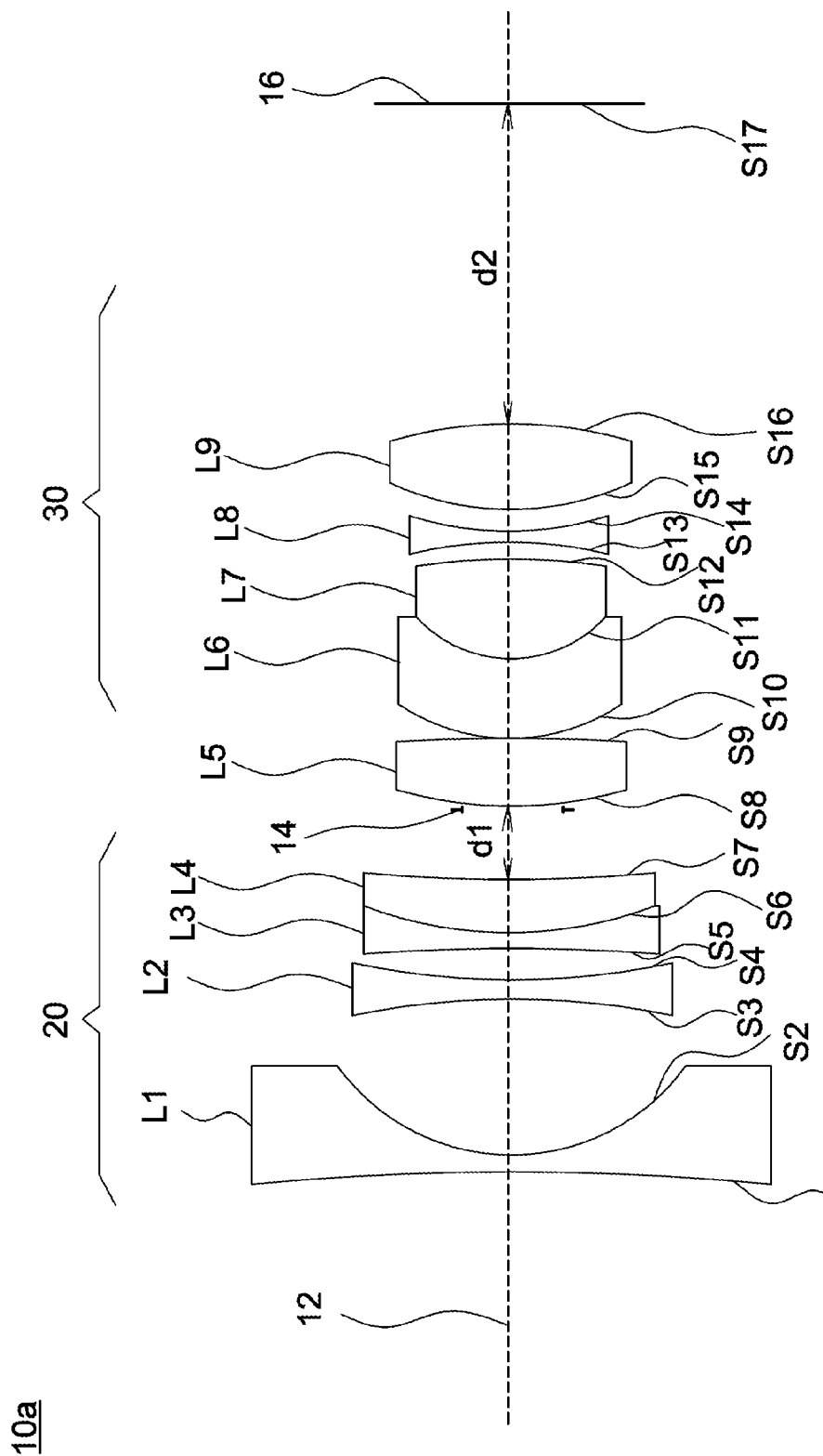

FIG. 1A and FIG. 1B are schematic diagrams respectively illustrating a zoom lens in the wide configuration and in the tele configuration according to an embodiment of the invention. As shown in FIG. 1A and FIG. 1B, a zoom lens 10a includes a first lens group 20, a second lens group 30 and an aperture stop 14 located between the first lens group 20 and the second lens group 30. The first lens group 20 and the second lens group 30 are capable of moving relative to the aperture stop 14 to switch between a wide configuration and a tele configuration. In detail, when the first lens group 20 and the second lens group 30 move towards each other, the zoom lens 10a is switched from the wide configuration to the tele configuration to decrease an interval d1 and increase an interval d2. In comparison, when the first lens group 20 and the second lens group 30 move away from each other, the zoom lens 10a is switched from the tele configuration to the wide configuration to increase the interval d1 and decrease the interval d2. In one embodiment, the first lens group 20 is movable in a direction of an optical axis 12 for focus adjustment, and the second lens group 30 is movable in the direction of the optical axis 12 for zooming.

The first lens group 20 has negative refractive power, and the second lens group 30 has positive refractive power. The first lens group 20 includes four lenses L1, L2, L3 and L4 arranged in order, along an optical axis 12, from a magnified side (on the left of FIG. 1A) to a minified side (on the right of FIG. 1A). The second lens group 30 includes five lenses L5, L6, L7, L8 and L9 arranged in order, along the optical axis 12, from the magnified side to the minified side. The refractive powers of the lens L1, L2, L3, L4, L5, L6, L7, L8 and L9 are negative, negative, negative, positive, positive, negative, positive, negative positive, respectively. In this embodiment, the last two lenses L8 and L9 in the second lens group 30 furthest from the aperture stop 14 are aspheric lenses. The lens L3 and lens L4 are cemented together as one piece to form a cemented doublet, and the lens L6 and lens L7 are cemented together as one piece to form another cemented doublet. Note that adjoining surfaces of each two adjacent lenses in a cemented lens have an identical radius of curvature, and that the lenses in a cemented lens can be cemented together by various ways. For example, the lenses may be cemented together by applying an optical adhesive on lens surfaces, stacked with each other and then stuck together by adhesive dispensing, or stacked and then pressed to be fitted with each other.

In the zoom lens 10a, the lens L1 has a concave magnified-side surface S1 and a concave minified-side surface S2, the lens L2 has a concave magnified-side surface S3 and a concave minified-side surface S4, the lens L3 has a concave magnified-side surface S5, the lens L4 has a convex magnified-side surface S6 and a concave minified-side surface S7, the lens L5 has a convex magnified-side surface S8 and a convex minified-side surface S9, the lens L6 has a convex magnified-side surface S10, the lens L7 has a convex minified-side surface S11 and a convex minified-side surface S12, the lens L8 has a concave magnified-side surface S13 and a concave minified-side surface S14, and the lens L9 has a convex magnified-side surface S15 and a convex minified-side surface S16.

The detailed optical data of the zoom lens 10a are shown in Table 1 and Table 2 below. Note the optical data provided below are not used for limiting the invention, and those skilled in the art may suitably modify parameters or settings of the following embodiment with reference of the invention without departing from the scope or spirit of the invention. Further, in Tables 2, 5 and 8, the value of IR focus shift is measured as a distance between an image plane for infrared light (wavelength=850 nm) and an image plane for D-light (wavelength=588 nm).

TABLE 1

| Surface | object | radius (mm) | thickness (mm) | refractive index | Abbe number |
|---|---|---|---|---|---|
| S1 | LensL1 (biconcave) | −247.86 | 0.7 | 1.65 | 50.8 |
| S2 | | 5.71 | 4.2 | | |
| S3 | Lens L2 (biconcave) | −21.27 | 0.5 | 1.44 | 90.9 |
| S4 | | 14.08 | 0.8 | | |
| S5 | Lens L3 (biconcave) | −135.45 | 0.5 | 1.52 | 52.4 |
| S6 | Lens L4 (meniscus) | 9.27 | 1.7 | 1.91 | 35.3 |
| S7 | | 214.06 | d1 | | |
| S8 | Lens L5 (biconvex) | 12.64 | 1.7 | 1.5 | 81.5 |
| S9 | | −46.94 | 0.1 | | |
| S10 | Lens L6 (meniscus) | 5.49 | 2.2 | 1.75 | 35.3 |
| S11 | Lens L7 (biconvex) | 3.26 | 2.6 | 1.5 | 81.5 |
| S12 | | −44.15 | 0.4 | | |
| S13 | Lens L8 (aspheric) | −14.59 | 0.5 | 1.64 | 24 |
| S14 | | 9.89 | 0.6 | | |
| S15 | Lens L9 (aspheric) | 7.65 | 2.2 | 1.54 | 56 |
| S16 | | −8.89 | d2 | | |
| S17 | Image sensor | ∞ | | | |

| | d1 | d2 |
|---|---|---|
| wide | 8.40 | 5.71 |
| tele | 0.81 | 8.81 |

TABLE 2

| | F/# | EFL (mm) | TTL (mm) | Ic/TTLw | TTLw/EFLw | IR Focus shift (mm) |
|---|---|---|---|---|---|---|
| wide | 1.8 | 3.33 | 32.85 | 0.11 | 9.86 | 0.016 |
| tele | 2.48 | 6.25 | 28.4 | — | — | 0.007 |

Further, the aspheric surface satisfies the following equation:

$$x = \frac{c'y^2}{1+\sqrt{1-(1+k)c'^2y^2}} + Ay^4 + By^6 + Cy^8 + Dy^{10} + Ey^{12} + Fy^{14} + Gy^{16} \ldots,$$

where x denotes a displacement from the vertex of a lens in the direction of the optical axis 12, c' denotes a reciprocal of the radius of curvature at the vertex of a lens (approaching the optical axis 12), K denotes a Conic constant, y denotes a height (distance in the direction perpendicular to the optical axis 12) of the aspheric surface, and A, B, C, D, E, F and G are aspheric coefficients. The values of aspheric coefficients and Conic constant of each lens surface are listed in Table 3.

TABLE 3

|  | K | A | B | C |
|---|---|---|---|---|
| S13 | 0 | −2.64E−03 | 2.54E−04 | −8.21E−06 |
| S14 | 0 | −2.44E−03 | 3.18E−04 | −1.30E−05 |
| S15 | 0 | −1.24E−03 | 5.19E−05 | −1.15E−06 |
| S16 | 0 | 4.74E−04 | −2.72E−06 | 6.01E−07 |

Figure 2A:
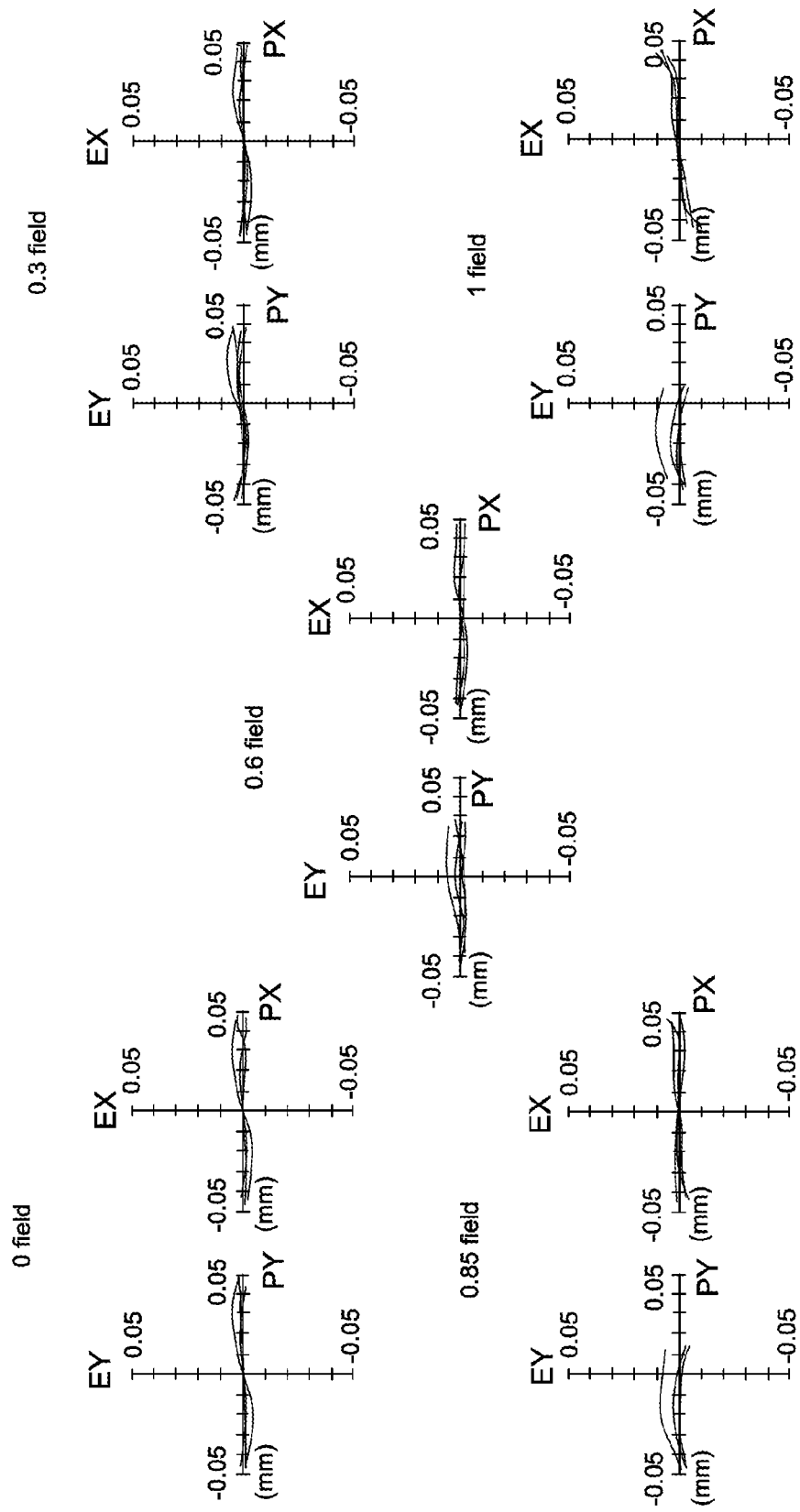
FIGS. 2A and 3A show optical simulation results of the zoom lens shown in FIG. 1A, and FIGS. 2B and 3B show optical simulation results of the zoom lens shown in FIG. 1B.
Figure 2B:
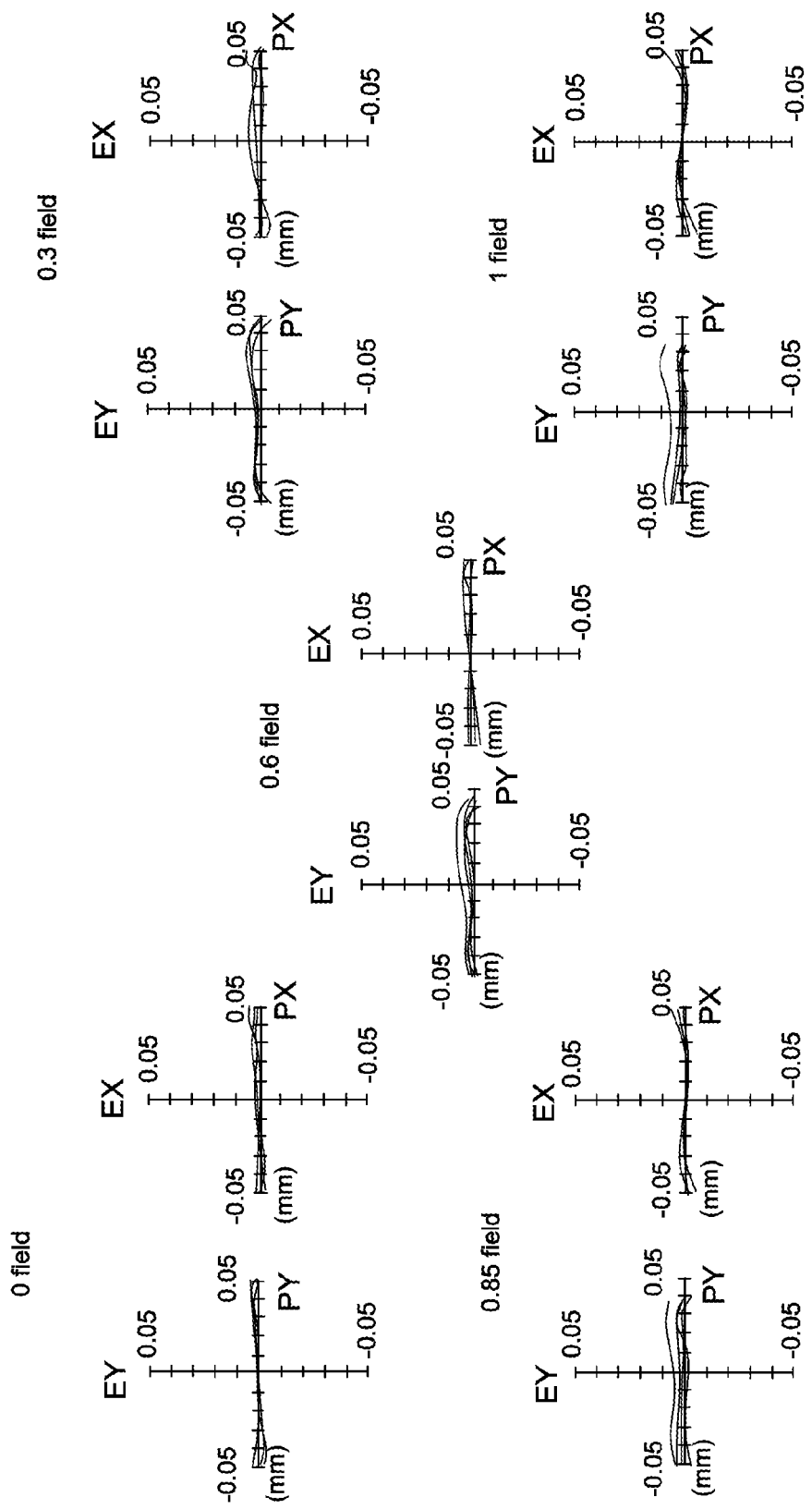
Figure 3A:
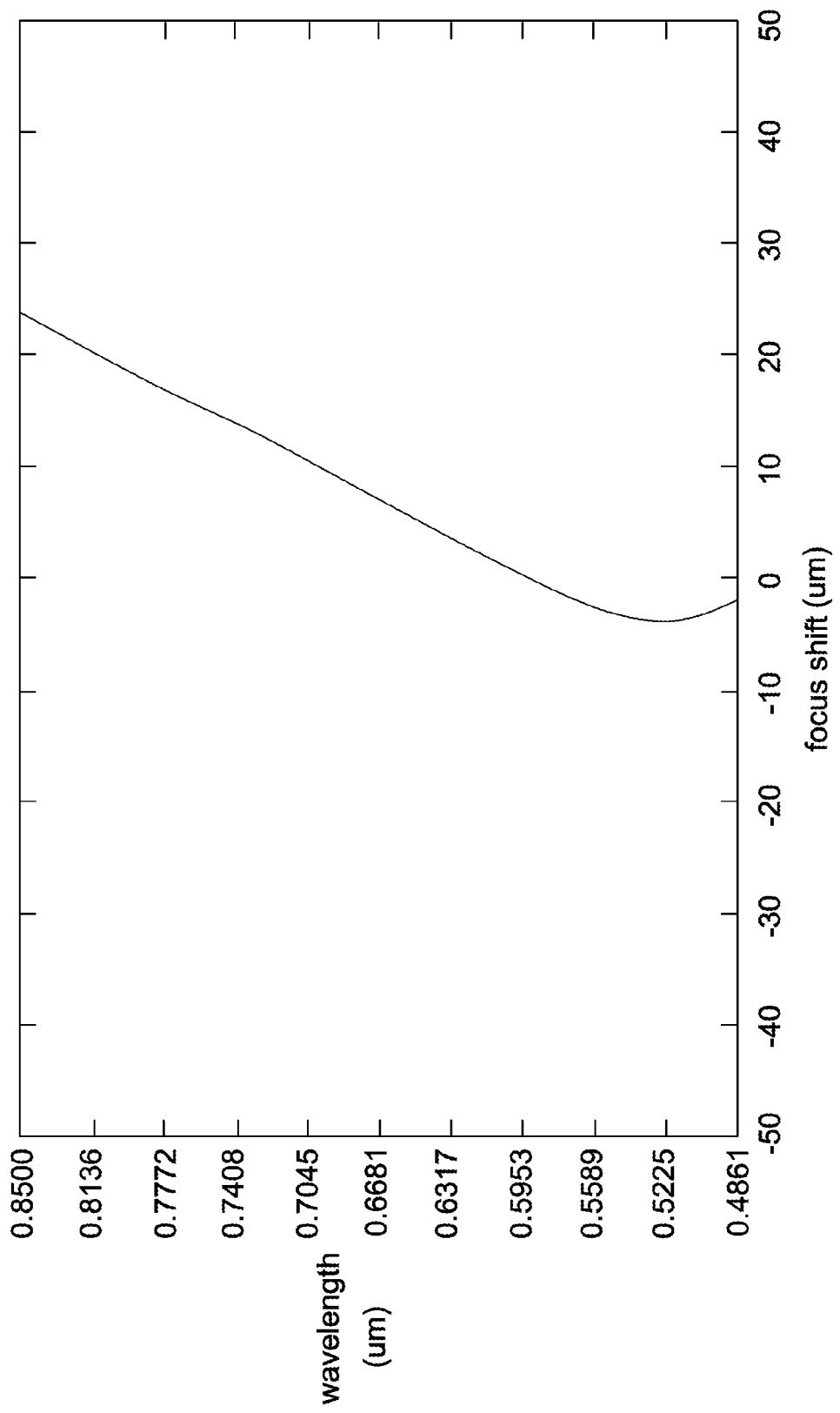
Figure 3B:
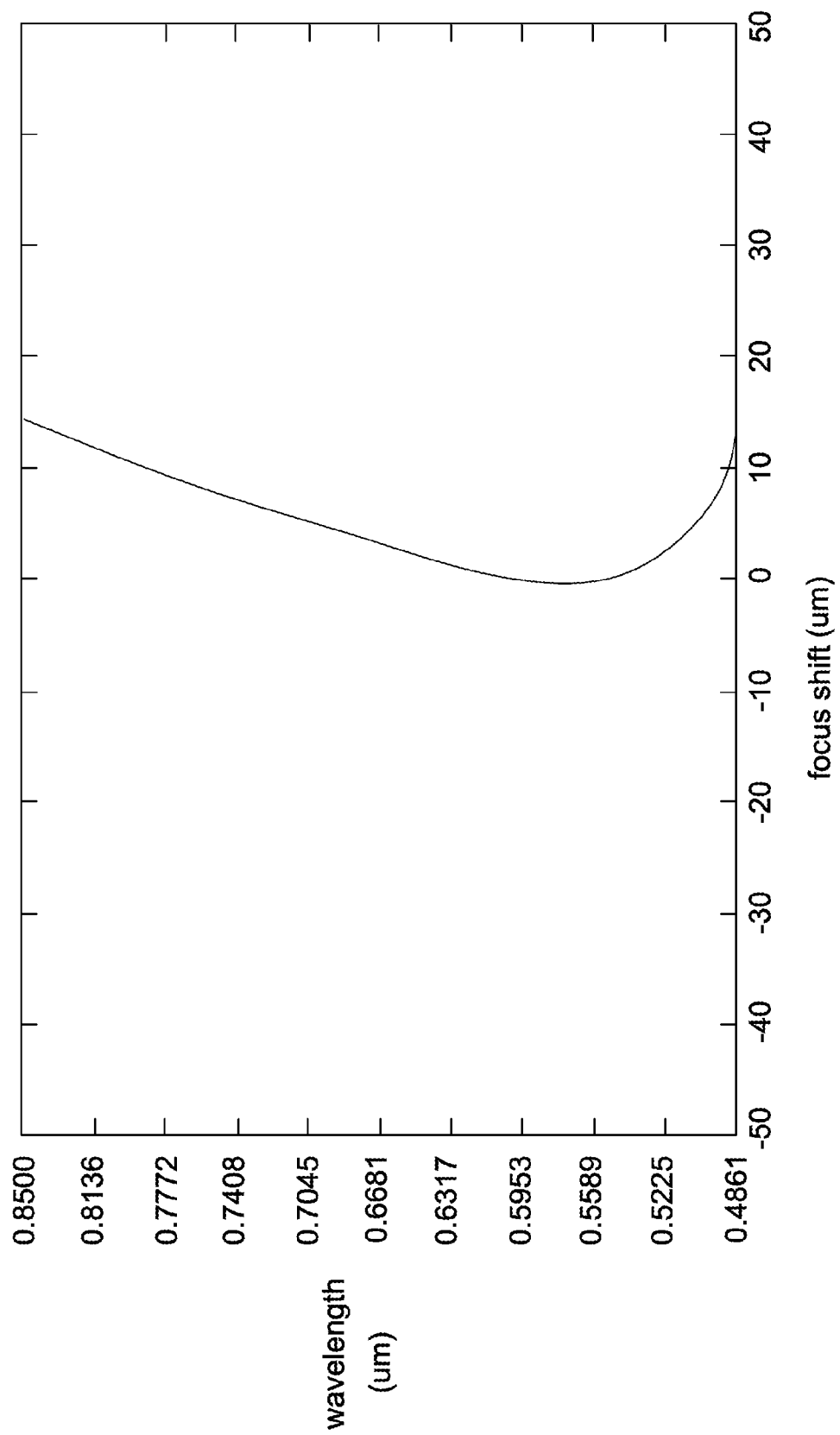

FIGS. 2A and 3A show optical simulation results of the zoom lens shown in FIG. 1A, and FIGS. 2B and 3B show optical simulation results of the zoom lens shown in FIG. 1B. More specifically, FIGS. 2A and 2B are transverse ray fan plots of images at different fields. Note the curves depicted in each transverse ray fan plot are respectively corresponding to a wavelength of 486 nm, 588 nm, 656 nm or 850 nm. In FIGS. 2A and 2B, coordinates of a horizontal axis refer to a position where a light ray passes through the aperture stop, and coordinates of a vertical axis refers to a distance between a position where the light ray forming an image on an image plane and a position where a chief ray forming an image on the image plane. FIGS. 3A and 3B illustrate the shift of focus under different wavelengths. It shows that a difference between an effective focal length for visible light and an effective focal length for infrared light is very small to allow for good 24-hours confocal image-capturing quality.

Figure 4:
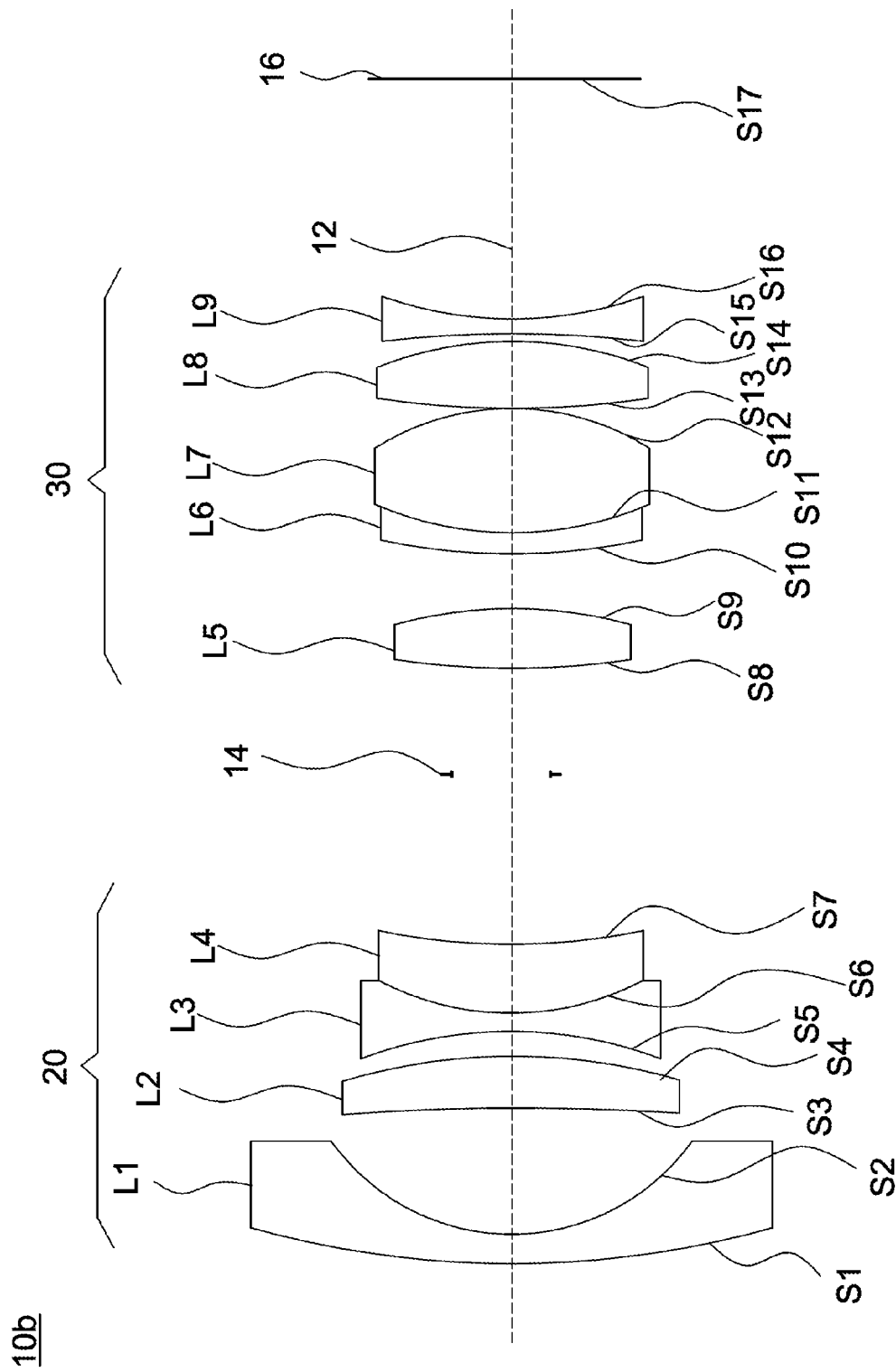
FIG. 4 shows a schematic diagram illustrating a zoom lens according to another embodiment of the invention.

A second design example of a zoom lens 10b including nine lenses L1-L9 (with respective refractive power of negative, positive, negative, positive, positive negative, positive, positive and negative) is described in detail below with reference to FIG. 4. The lens L3 and lens L4 are cemented together as one piece to form a cemented doublet, and the lens L6 and lens L7 are cemented together as one piece to form another cemented doublet. The lenses L5, L8 and L9 are aspheric lenses. The detailed optical data of the second example are shown in Table 4 and Table 5, and the aspheric surface data are shown in Table 6 below.

TABLE 4

| Surface | object | radius (mm) | thickness (mm) | refractive index | Abbe number |
|---|---|---|---|---|---|
| S1 | LensL1 (meniscus) | 29.37 | 0.69 | 1.86 | 26.60 |
| S2 |  | 5.83 | 3.56 |  |  |
| S3 | Lens L2 (meniscus) | −52.27 | 1.48 | 1.92 | 21.60 |
| S4 |  | −17.41 | 0.71 |  |  |
| S5 | Lens L3 (biconcave) | −10.09 | 0.50 | 1.50 | 81.50 |
| S6 | Lens L4 (meniscus) | 7.02 | 2.02 | 1.90 | 31.30 |
| S7 |  | 15.95 | d1 |  |  |
| S8 | Lens L5 (aspheric) | 19.88 | 1.47 | 1.58 | 59.10 |
| S9 |  | −17.60 | 1.59 |  |  |
| S10 | Lens L6 (meniscus) | 19.95 | 0.50 | 1.66 | 28.00 |
| S11 | Lens L7 (biconvex) | 7.62 | 3.41 | 1.50 | 81.50 |
| S12 |  | −6.71 | 0.10 |  |  |
| S13 | Lens L8 (aspheric) | 10.64 | 1.94 | 1.54 | 56.10 |
| S14 |  | −13.40 | 0.10 |  |  |
| S15 | Lens L9 (aspheric) | −45.07 | 0.50 | 1.64 | 24.00 |
| S16 |  | 7.83 | d2 |  |  |
| S17 | Image sensor | ∞ |  |  |  |

|  | d1 | d2 |
|---|---|---|
| wide | 7.91 | 6.45 |
| tele | 1.31 | 5.57 |

TABLE 5

|  | F/# | EFL (mm) | TTL (mm) | Ic/TTLw | TTLw/EFLw | IR Focus shift (mm) |
|---|---|---|---|---|---|---|
| wide | 1.8 | 3.28 | 32.95 | 0.11 | 10.05 | 0.014 |
| tele | 2.44 | 6.09 | 29.04 | — | — | 0.017 |

TABLE 6

|  | K | A | B | C | D |
|---|---|---|---|---|---|
| S8 | 0 | −2.41E−03 | −4.73E−05 | −5.49E−06 | 3.57E−07 |
| S9 | 0 | −1.89E−03 | 2.52E−06 | −4.87E−06 | 3.23E−07 |
| S13 | 0 | −2.06E−03 | −5.64E−05 | 3.30E−06 | 0 |
| S14 | 0 | −7.73E−04 | −7.85E−05 | 5.80E−06 | −1.00E−07 |
| S15 | 0 | 2.36E−03 | −4.32E−04 | 2.28E−05 | −4.64E−07 |
| S16 | 0 | 1.89E−03 | −4.67E−04 | 2.41E−05 | −4.50E−07 |

Figure 5A:
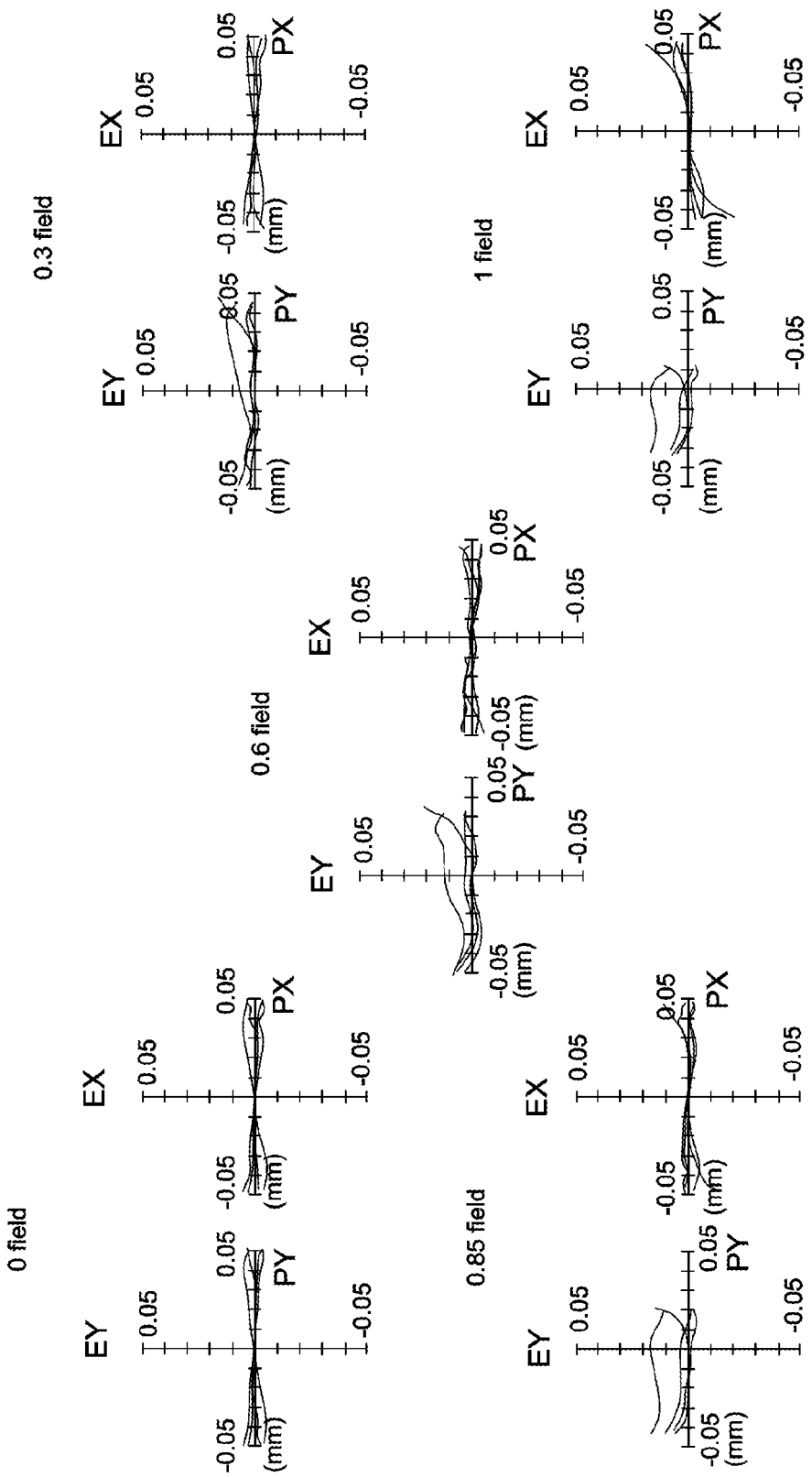
FIGS. 5A and 6A show optical simulation results of a zoom lens in the wide configuration.
Figure 5B:
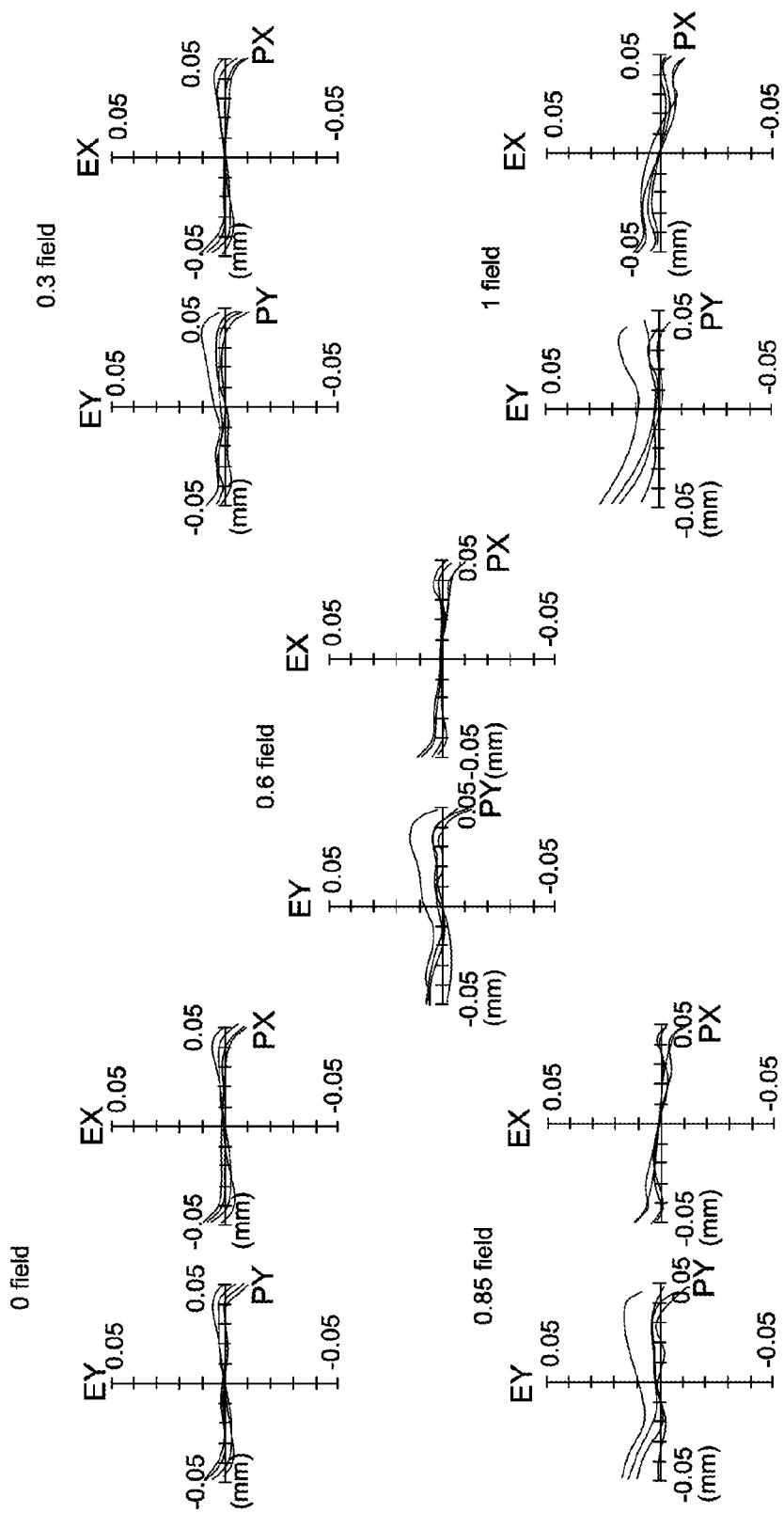
FIGS. 5B and 6B show optical simulation results of the zoom lens in the tele configuration according to another embodiment of the invention.
Figure 6A:
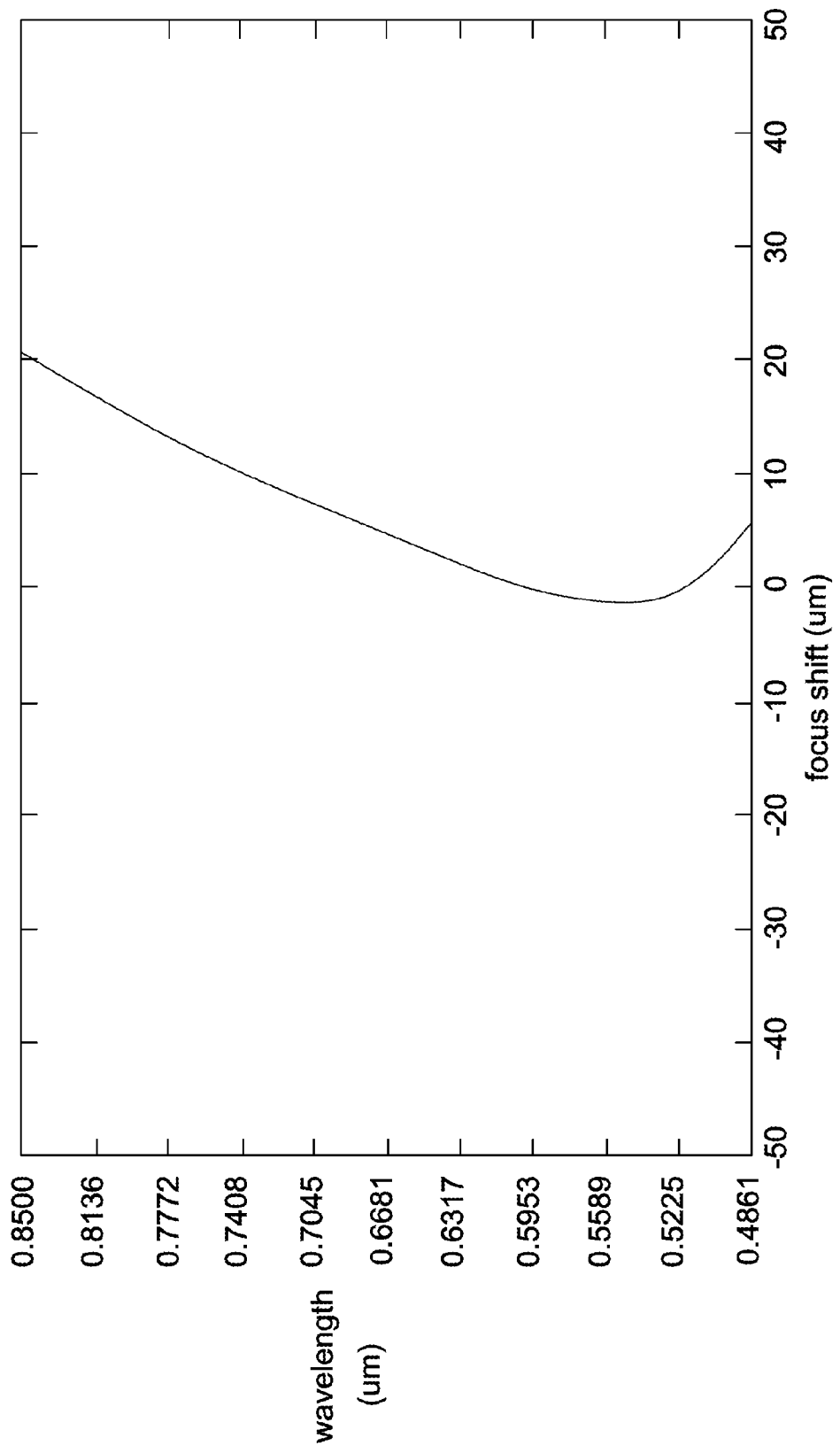
Figure 6B:
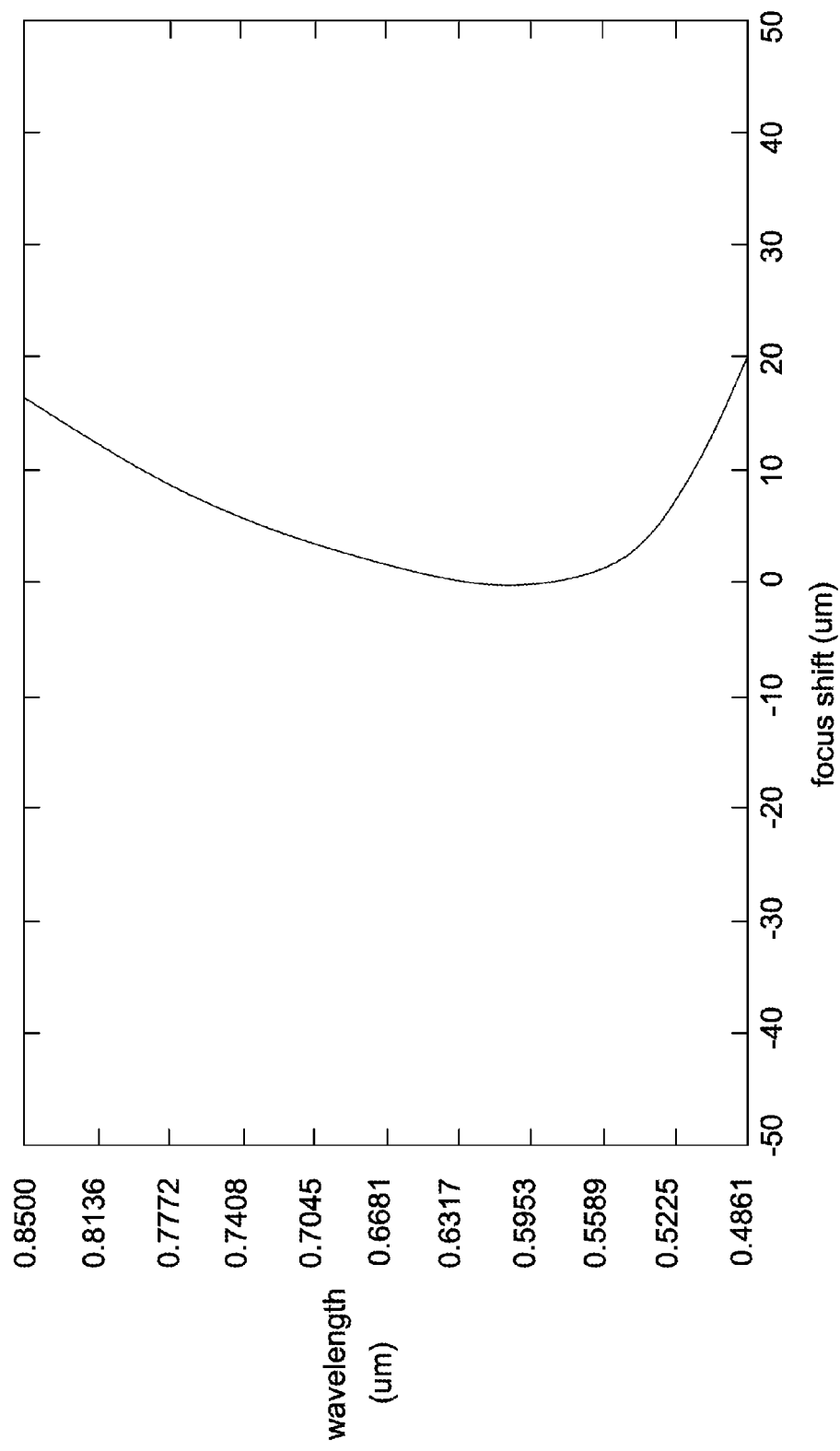

FIGS. 5A and 6A show optical simulation results of the zoom lens 10b in the wide configuration, and FIGS. 5B and 6B show optical simulation results of the zoom lens 10b in the tele configuration. More specifically, FIGS. 5A and 5B are transverse ray fan plots of images at different fields, and FIGS. 6A and 6B illustrate the shift of focus under different wavelengths. It shows that a difference between an effective focal length for visible light and an effective focal length for infrared light is very small to allow for good 24-hours confocal image-capturing quality.

Figure 7:
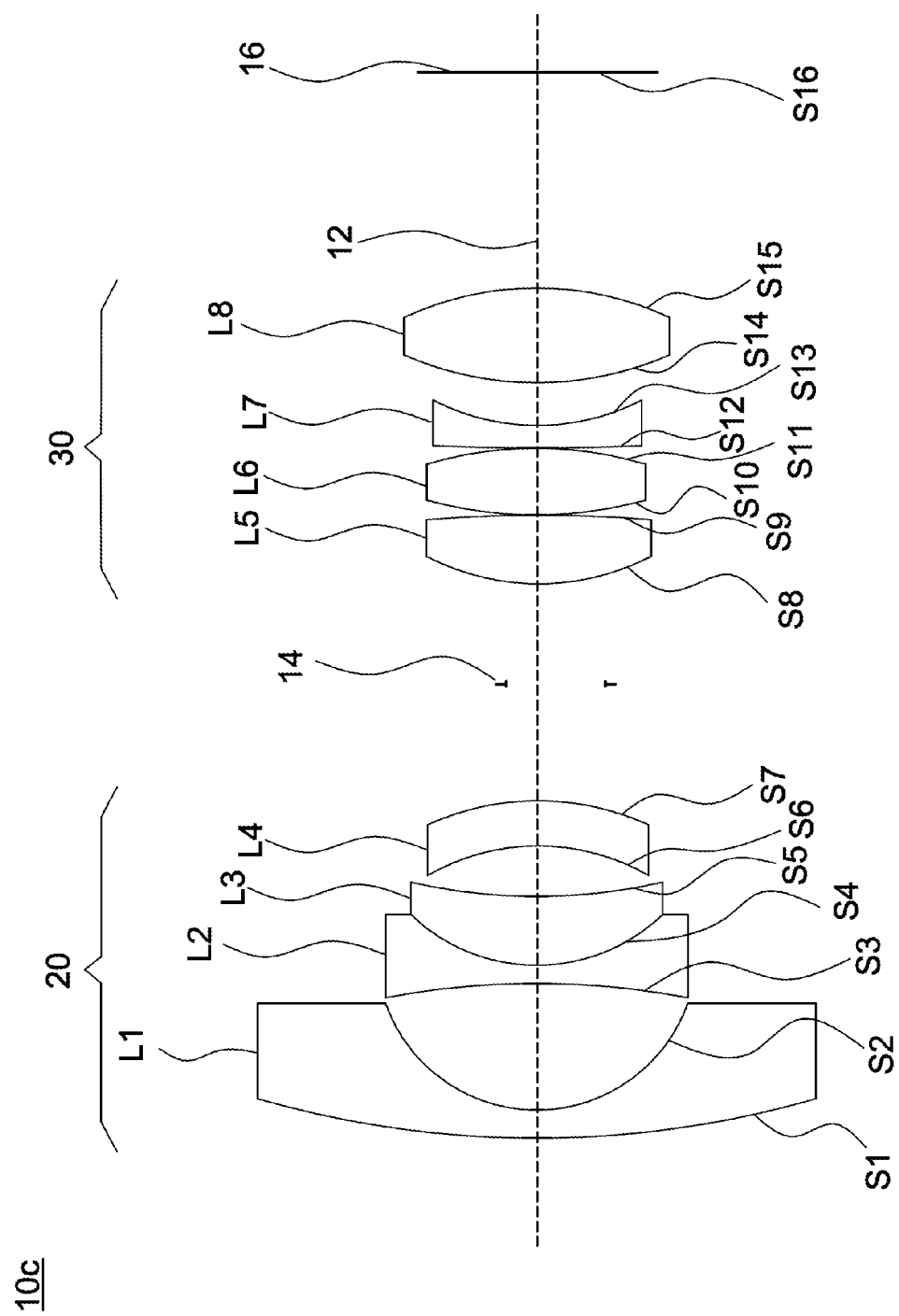
FIG. 7 shows a schematic diagram illustrating a zoom lens according to another embodiment of the invention.

A third design example of a zoom lens 10c including eight lenses L1-L8 (with respective refractive power of negative, negative, positive, negative, positive, positive, negative and positive) is described in detail below with reference to FIG. 7. The lens L2 and lens L3 are cemented together as one piece to form a cemented doublet, and the lenses L4, L5 and L7 are aspheric lenses. The detailed optical data of the third example are shown in Table 7 and Table 8, and the aspheric surface data are shown in Table 9 below.

TABLE 7

| Surface | object | radius (mm) | thickness (mm) | refractive index | Abbe number |
|---|---|---|---|---|---|
| S1 | LensL1 (meniscus) | 32.82 | 0.80 | 1.61 | 44.30 |
| S2 |  | 4.74 | 3.82 |  |  |
| S3 | Lens L2 (biconcave) | −26.36 | 0.55 | 1.70 | 41.20 |
| S4 | Lens L3 (meniscus) | 5.09 | 2.34 | 1.92 | 24.30 |
| S5 |  | 21.85 | 1.45 |  |  |
| S6 | Lens L4 (aspheric) | −5.95 | 1.36 | 1.54 | 56.10 |
| S7 |  | −8.10 | d1 |  |  |
| S8 | Lens L5 (aspheric) | 6.76 | 1.87 | 1.54 | 56.10 |
| S9 |  | −40.21 | 0.14 |  |  |
| S10 | Lens L6 (biconvex) | 13.21 | 2.02 | 1.55 | 94.90 |
| S11 |  | −11.26 | 0.10 |  |  |

TABLE 7-continued

| | | | | | |
|---|---|---|---|---|---|
| S12 | Lens L7 (aspheric) | 159.72 | 0.55 | 1.64 | 24.00 |
| S13 | | 6.04 | 1.53 | | |
| S14 | Lens L8 (biconvex) | 10.16 | 2.72 | 1.50 | 81.50 |
| S15 | | −8.55 | d2 | | |
| S16 | Image sensor | ∞ | | | |

| | d1 | d2 |
|---|---|---|
| wide | 10.62 | 6.29 |
| tele | 0.31 | 11.37 |

TABLE 8

| | F/# | EFL (mm) | TTL (mm) | Ic/TTLw | TTLw/EFLw | IR Focus shift (mm) |
|---|---|---|---|---|---|---|
| wide | 1.8 | 3.25 | 32.7 | 0.11 | 10.06 | 0.014 |
| tele | 2.55 | 5.4 | 29.7 | — | — | 0.007 |

TABLE 9

| | K | A | B | C | D | E |
|---|---|---|---|---|---|---|
| S6 | 0 | −2.72E−04 | 1.75E−05 | 0 | 0 | 0 |
| S7 | 0 | −1.79E−04 | 1.45E−05 | −1.71E−07 | 0 | 0 |
| S8 | 0 | −2.54E−04 | 1.90E−05 | −2.20E−06 | 3.99E−08 | 0 |
| S9 | 0 | 9.60E−04 | 1.41E−05 | −3.22E−06 | 8.56E−08 | 0 |
| S12 | 0 | 7.22E−04 | −1.73E−04 | 8.08E−06 | −1.25E−07 | 0 |
| S13 | 0 | 1.25E−03 | −1.78E−04 | 9.86E−06 | −1.50E−07 | −1.61E−09 |

Figure 8A:
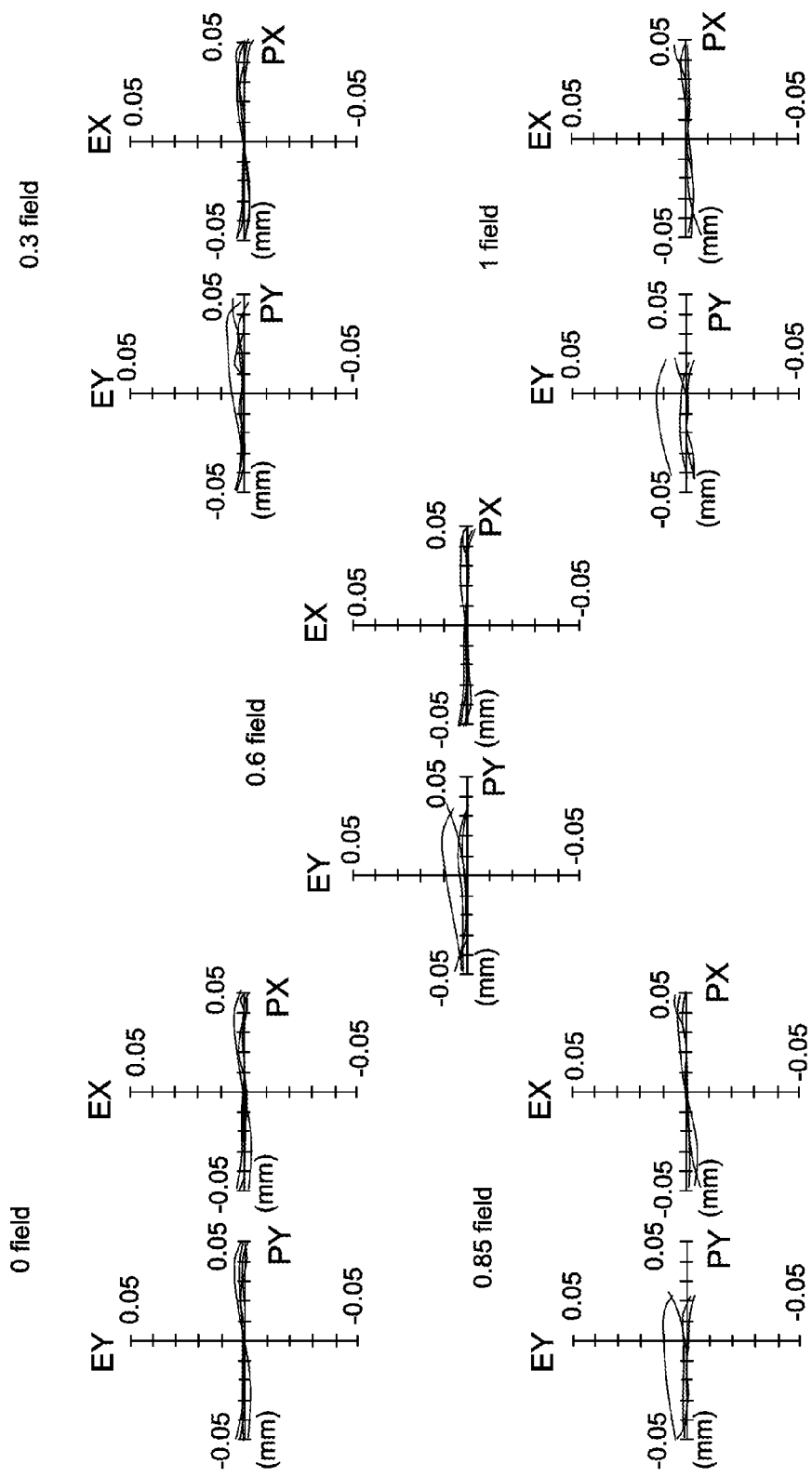
FIGS. 8A and 9A show optical simulation results of a zoom lens in the wide configuration.
Figure 8B:
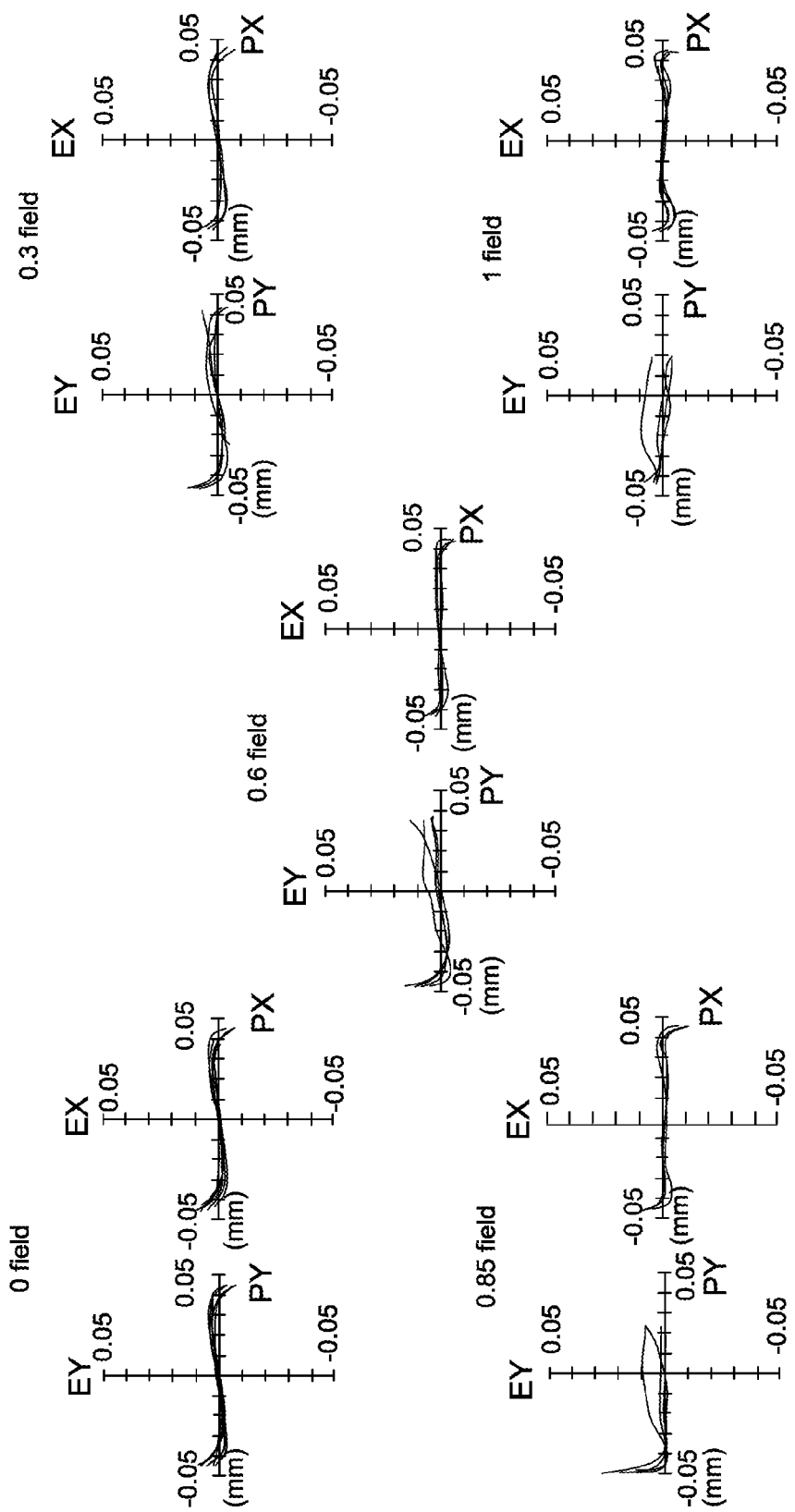
FIGS. 8B and 9B show optical simulation results of the zoom lens in the tele configuration according to another embodiment of the invention.
Figure 9A:
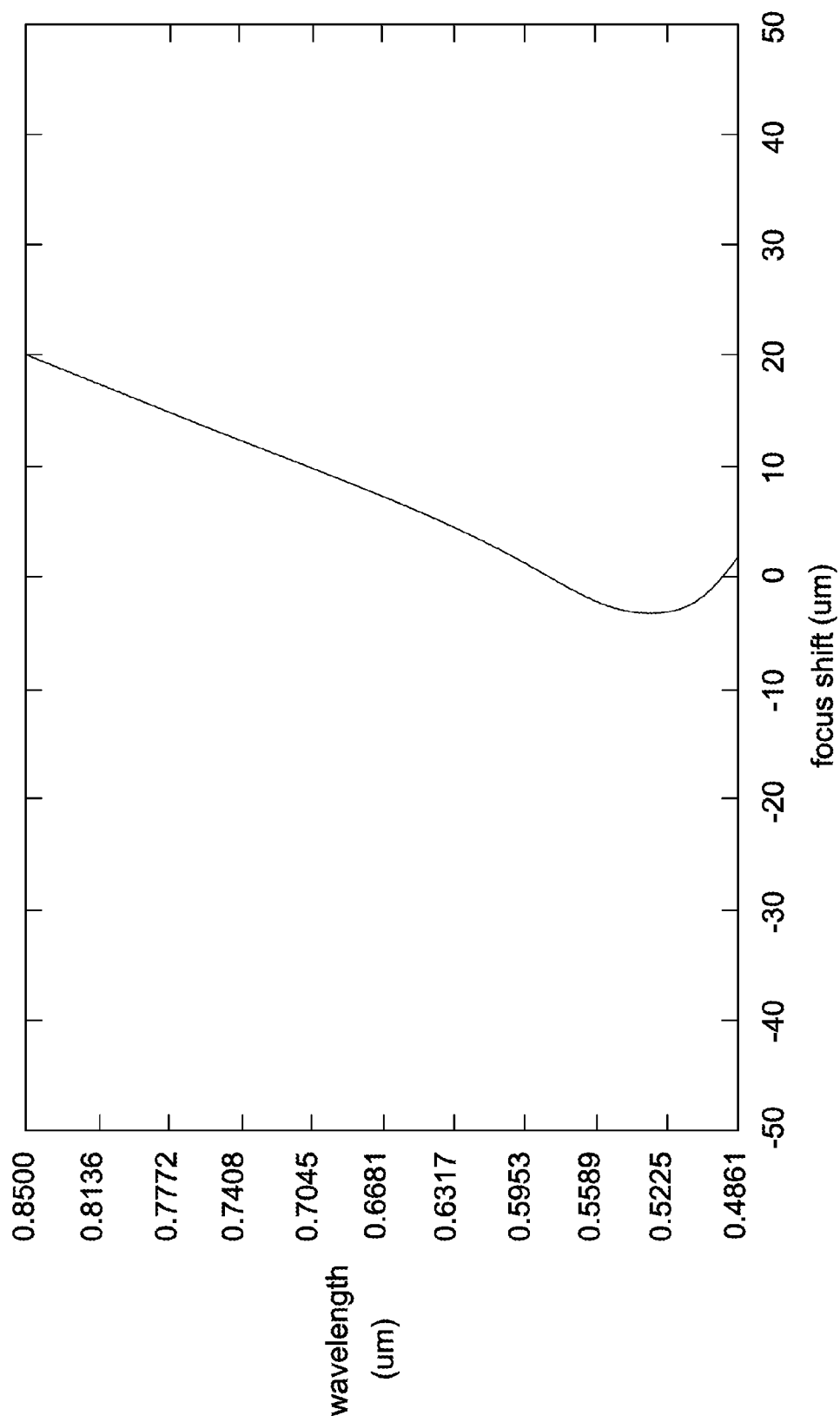
Figure 9B:
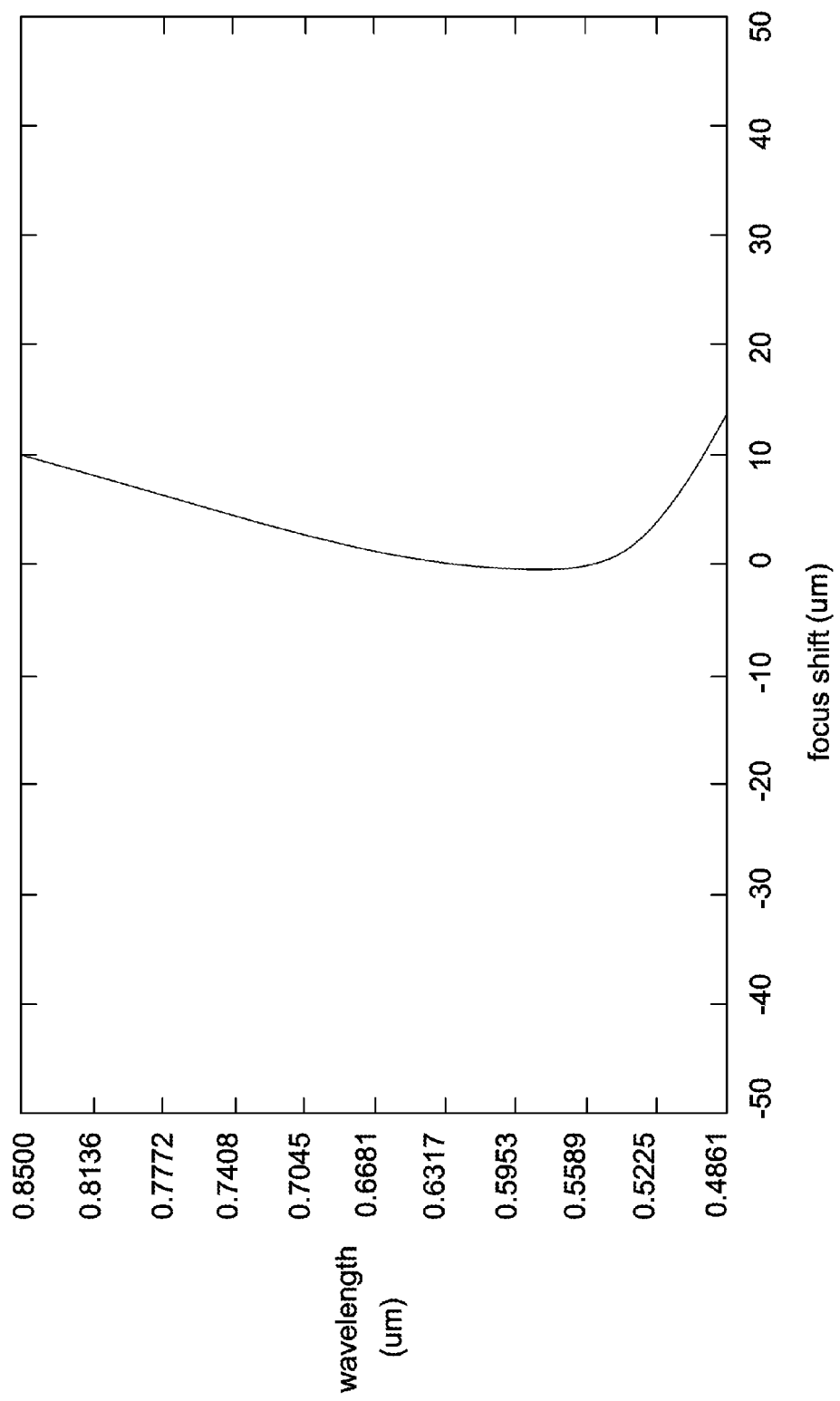

FIGS. 8A and 9A show optical simulation results of the zoom lens 10c in the wide configuration, and FIGS. 8B and 9B show optical simulation results of the zoom lens 10c in the tele configuration. More specifically, FIGS. 8A and 8B are transverse ray fan plots of images at different fields, and FIGS. 9A and 9B illustrate the shift of focus under different wavelengths. It shows that a difference between an effective focal length for visible light and an effective focal length for infrared light is very small to allow for good 24-hours confocal image-capturing quality.

The simulated results are all within permitted ranges specified by the standard, which indicates the zoom lens according to all the above design examples may achieve good imaging quality.

According to the above embodiments, the zoom lens may have at least one cemented lens to balance chromatic aberration, and may have at least one aspheric lens to reduce aberration and the total track length. Further, the zoom lens may have a reduced number of lenses and wide viewing angles. Besides, when the zoom lens is used for imaging under visible light and infrared light, chromatic aberrations may be corrected to result in small focus shift to achieve good 24-hours confocal imaging quality.

Figure 10:
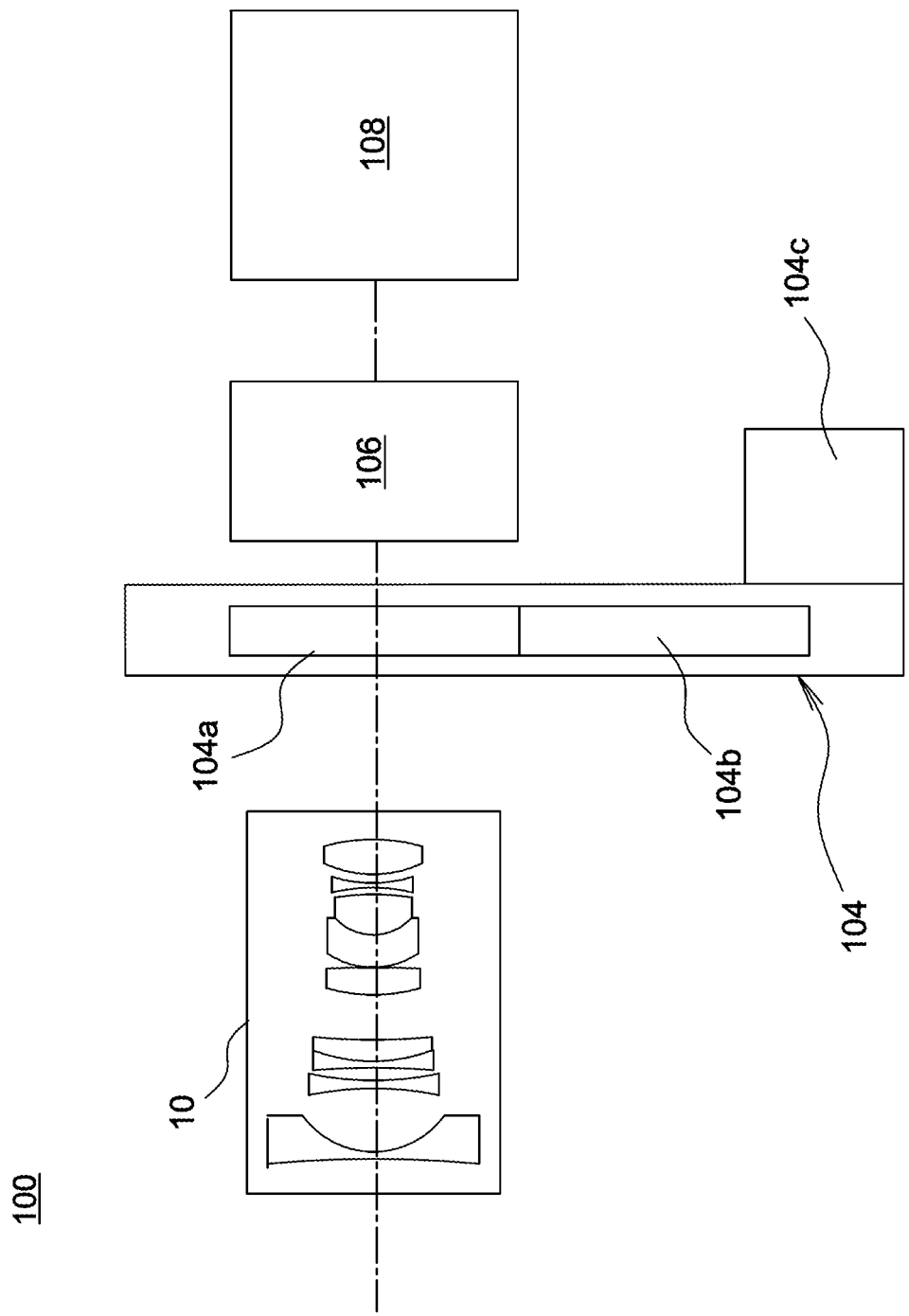
FIG. 10 shows an image pickup device according to an embodiment of the invention.

FIG. 10 shows an image pickup device according to an embodiment of the invention. As shown in FIG. 10, an image pickup device 100 may include an optical lens 10, an optical filter switching assembly 104, an image sensor 106, and an image signal processor 108. The optical filter switching assembly 104 includes an infrared-cut filter plate 104a, an anti-reflection coating plate 104b, and a driving device 104c. The driving device 104c may respectively switch the infrared-cut filter plate 104a and the anti-reflection coating plate 104b to a position between the optical lens 10 and the image sensor 106. The image sensor 106 converts the image information passing through the infrared-cut filter plate 104a or the anti-reflection coating plate 104b into an electrical signal. The image signal processor 108 converts the electric signal into a video image signal and outputs the video image signal to a CCTV or a monitoring system (not shown). The filters plates 104a and 104b may be made of glass with a determined thickness. In case the zoom lens 10a, 10b or 10c according to the above embodiments serves as the optical lens 10, the infrared-cut filter plate 104a and the anti-reflection coating plate 104b may have an identical thickness, because the focus shift that equals a difference between an effective focal length for imaging under visible light and an effective focal length for imaging under infrared light is very small.

Note the parameters listed in Tables 1-9 are only for exemplified purposes but do not limit the invention. It should be appreciated that variations about the design parameters or setting may be made in the embodiments by persons skilled in the art without departing from the scope of the invention. Therefore, any zoom lens of the same structure is considered to be within the scope of the present disclosure even if it uses different data. The embodiments depicted above and the appended drawings are exemplary and are not intended to limit the scope of the present disclosure.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A zoom lens comprising in order from a magnified side to a minified side:
   a first lens group;
   an aperture stop; and
   a second lens group, wherein the conditions:
   $0.1 < Ic/TTLw < 0.15$;
   $3.25 \leq EFL \leq 6.25$; and
   $TTLw/EFLw \leq 10$ are satisfied, where Ic denotes a radius of an image circle, EFL denotes an effective focal length of the zoom lens, TTLw denotes a total track length of the zoom lens in the wide configuration, and EFLw denotes an effective focal length of the zoom lens in the wide configuration,
   wherein a focus shift in an image plane for infrared (IR) of the zoom lens is smaller than 0.02 mm.

2. The zoom lens as claimed in claim 1, wherein the total track length of the zoom lens is smaller than 33.2 mm.

3. The zoom lens as claimed in claim 1, wherein the second lens group has at least one cemented lens.

4. The zoom lens as claimed in claim 1, wherein the first lens group has negative refractive power and the second lens group has positive refractive power.

5. The zoom lens as claimed in claim 1, wherein the first lens group comprises in order from the magnified side to the minified side:
   a first lens having negative refractive power;
   a second lens having refractive power;
   a third lens having refractive power; and
   a fourth lens having refractive power.

6. The zoom lens as claimed in claim 5, wherein the second lens group comprises in order from the magnified side to the minified side:
   a fifth lens having positive refractive power;
   a sixth lens having refractive power;
   a seventh lens having refractive power; and
   an eighth lens having refractive power.

7. The zoom lens as claimed in claim 6, further comprises:
   a ninth lens having positive refractive power.

8. The zoom lens as claimed in claim 1, wherein two lenses having refractive power in the second lens group furthest from the aperture stop are aspheric lenses.

9. The zoom lens as claimed in claim 1, wherein an F number of the zoom lens is in the range of 1.8 to 2.48.

10. The zoom lens as claimed in claim 1, wherein a lens in the first lens group located furthest from the aperture stop has a concave magnified-side surface.

11. A zoom lens comprising:
    a first lens group of negative refractive power;
    a second lens group of positive refractive power; and
    an aperture stop located between the first lens group and the second lens group, wherein two lenses having refractive power in the second lens group furthest from the aperture stop are aspheric lenses, and the conditions:
    $1.7 \leq EFLt/EFLw \leq 3$ and $3.25\ mm \leq EFL \leq 6.25$ are satisfied, where EFLt denotes an effective focal length of the zoom lens in the tele configuration, EFLw denotes an effective focal length of the zoom lens in the wide configuration, and EFL denotes an effective focal length of the zoom lens,
    wherein a focus shift in an image plane for infrared (IR) of the zoom lens is smaller than 0.02 mm.

12. The zoom lens as claimed in claim 11, further comprising:
    an infrared-cut filter plate and an anti-reflection coating filter plate capable of being alternately disposed between the second lens group and an image sensor, wherein the infrared-cut filter plate and the anti-reflection coating plate have a substantially identical thickness.

13. The zoom lens as claimed in claim 11, wherein a total track length of the zoom lens is smaller than 33.2 mm.

14. The zoom lens as claimed in claim 11, wherein an F number of the zoom lens is in the range of 1.8 to 2.48.

15. The zoom lens as claimed in claim 11, wherein the condition:
    $0.1 < Ic/TTLw < 0.15$ is satisfied, where Ic denotes a radius of an image circle, and TTLw denotes a total track length of the zoom lens in the wide configuration.

16. The zoom lens as claimed in claim 11, wherein the condition:
    $TTLw/EFLw \leq 10$ is satisfied, where TTLw denotes a total track length of the zoom lens in the wide configuration, and EFLw denotes an effective focal length of the zoom lens in the wide configuration.

17. The zoom lens as claimed in claim 11, wherein the first lens group has at least one cemented doublet.

18. The zoom lens as claimed in claim 11, wherein the second lens group has at least one cemented doublet.

19. A zoom lens, comprising:
    a first lens having refractive power;
    a second lens having refractive power;
    a third lens having refractive power;
    a fourth lens having refractive power;
    an aperture stop;
    a fifth lens having refractive power;
    a sixth lens having refractive power,
    a seventh lens having refractive power;
    a eighth lens having refractive power; and
    a ninth lens having refractive power, wherein the third lens and the fourth lens are cemented together to form a first cemented doublet, the sixth lens and the seventh lens are cemented together to form a second cemented doublet, and the conditions:
    $0.1 < Ic/TTLw < 0.15$ and $3.25 \leq EFL \leq 6.25$ are satisfied, where Ic denotes a radius of an image circle, TTLw denotes a total track length of the zoom lens in the wide configuration, and EFL denotes an effective focal length of the zoom lens.

* * * * *